Figure 1:
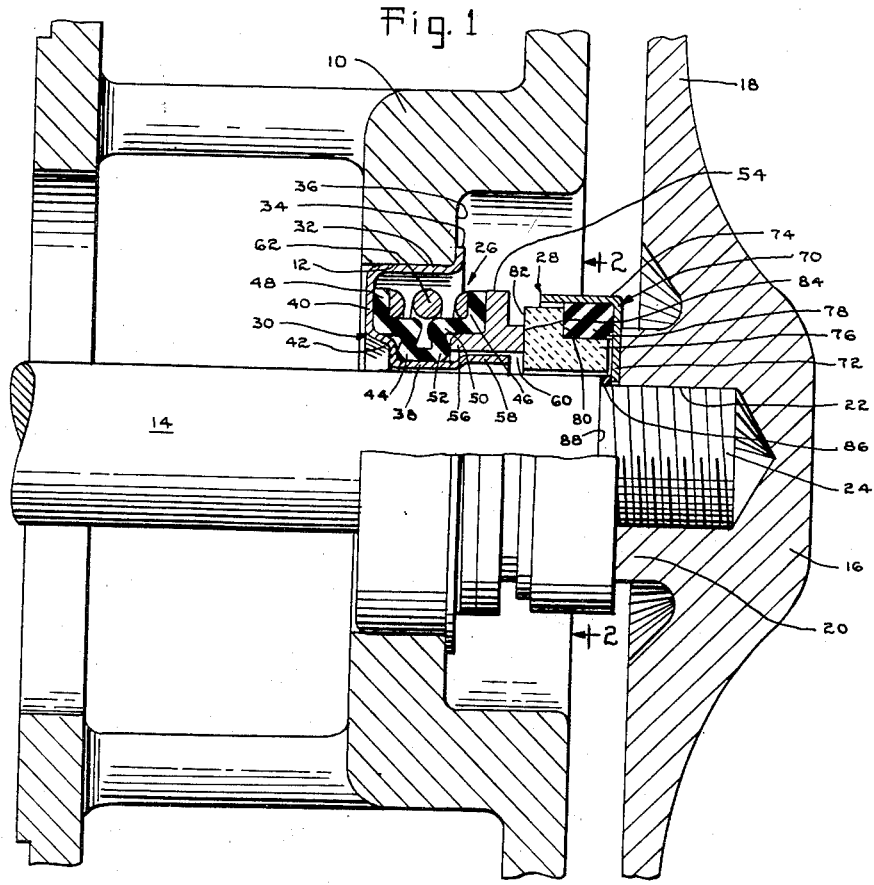

March 19, 1957  A. J. SOLARI  2,785,913
ROTARY MECHANICAL SEAL WITH CERAMIC SEAT
Filed April 20, 1954

INVENTOR.
ARCHIE J. SOLARI
BY
Edward R. Lowndes

United States Patent Office 2,785,913
Patented Mar. 19, 1957

2,785,913

ROTARY MECHANICAL SEAL WITH CERAMIC SEAT

Archie J. Solari, Chicago, Ill., assignor to Crane Packing Company, Chicago, Ill., a corporation of Illinois Application April 20, 1954, Serial No. 424,310

3 Claims. (Cl. 286—11.14)

The present invention relates to improvements in rotary mechanical shaft seals of the type which effect a seal against the passage of fluid between relatively movable machine parts, as for example between a shaft and a casing within which the shaft is rotatably mounted. Still more specifically the invention relates to sealing devices of this character in which the sealing effect between the relatively moving parts occurs at radially extending surfaces and wherein a so-called running seal is provided between the moving parts.

The running surfaces associated with rotary mechanical seals of the type briefly outlined above are usually provided on a pair of opposed sealing elements, one of which is generally known as the seal seat and the other of which is commonly termed the sealing washer. Usually one of these members is maintained stationary with the casing to which it is effectively sealed and the other member is caused to rotate with the shaft to which it likewise is effectively sealed. Sometimes the seat member is press fitted within the opening in the casing through which the shaft extends while the washer is positively driven from the shaft which it surrounds. In other installations the seat member is driven from the shaft while the washer constitutes a part of a spring retainer and bellows assembly which is press fitted into the opening in the casing so that the washer remains stationary and is yieldingly urged against the rotating seat member. The present invention is concerned particularly with a novel form of sealing seat assembly designed for use in connection with rotary mechanical seals of the type wherein the seat member is secured to and rotates with the shaft while the sealing washer is sealed and remains stationary with the casing.

In seals for pumps which handle fluids containing abrasive materials, as for example in well drilling apparatus where a considerable quantity of silt and other fine abrasives are encountered, as well as in connection with pumps which are used in certain construction jobs where abrasive materials are handled, the usual seal materials employed in forming the seal seat are subject to wear with a consequent tendency for rapid seal failure. To overcome this difficulty seal seats have been designed which are comprised of a ceramic material in order to better withstand the wear imposed by the abrasive material undergoing pumping. In order to maintain these annular ceramic seat elements with their radial sealing surfaces in proper radial alignment with respect to the shaft, it has been customary to mount these members on an internal rubber sleeve or bushing, the sleeve serving not only to seal the ceramic seat member with respect to the shaft but also to establish a friction drive from the shaft through the bushing to the seat member. Without the use of such resilient mounting means for the annular ceramic seat member, fracture of the member is likely to occur when the application of driving torque is applied directly from the shaft to the seat member. The use of internal resilient sealing and driving elements in connection with such ceramic seat members imposes relatively high outwardly directed radial tension on the ceramic seat member which greatly weakens the coherence of the ceramic material so that the same is subject to fracture even when slight shocks are applied thereto. In addition to this disadvantage it sometimes happens that a seal will temporarily run dry and become extremely hot and thus when the liquid supply is restored and is applied to the ceramic seat, the same will become shattered and will literally explode due to the radially outwardly directed forces to which the seat member is subjected.

The present invention is designed to overcome the above noted limitations that are attendant upon the use of annular ceramic seats for rotary mechanical seals and toward this end it contemplates the provision of a self-contained unitary seat construction including an annular ring of ceramic material which constitutes the seat element proper and an outer metal retainer or shell therefor which partially encompasses the inner ceramic seat element proper and which is separated therefrom by a resilient spacing member or ring which exerts a high inwardly directed compressional force on the ceramic seat and which at the same time serves to maintain the seat within the retainer so that the seat is at all times under compression thus giving good coherence to the material of the seat and preventing the tendency for the seat to shatter when subjected to shocks or when subjected to a temperature differential which would otherwise crack the seat. The provision of a rotary mechanical seal having a ceramic seat assembly of the character briefly outlined above being among the principal objects of the invention, another object is to provide a seat element for such an assembly in which the driving torque from the central shaft upon which the seat is mounted is applied to the seat element proper from a peripheral region of the seat element thereby resulting in more positive drive for the seat element without involving slippage of the parts.

Other objects and advantages of the invention not at this time enumerated will become more readily apparent as the following description ensues.

In the accompanying single sheet of drawings forming a part of this specification a preferred embodiment of the invention has been shown.

Figure 2:
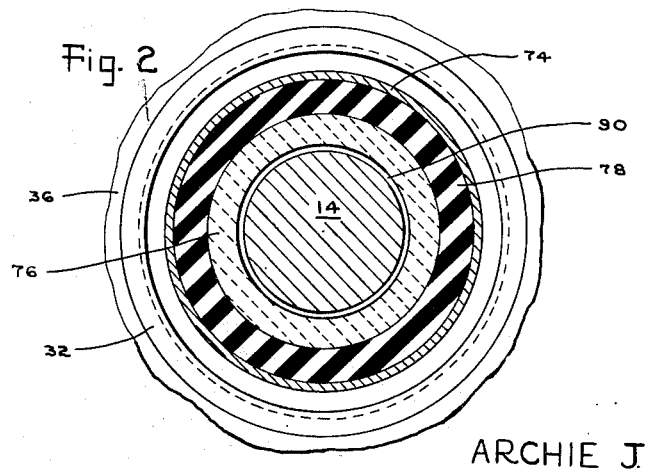

In these drawings:

Fig. 1 is a longitudinal sectional view partly an elevation taken substantially centrally through a rotary mechanical seal constructed in accordance with the principles of the present invention and showing the same operatively installed in a pump construction, and Fig. 2 is a sectional view taken substantially along the line 2—2 of Fig. 1.

Referring now to the drawings in detail, the structure selected for illustration of a typical use for the present rotary mechanical seal may be assumed to be a centrifugal impeller-type pump including a housing 10 having a central opening 12 therein through which passes the usual pump shaft 14. The pump shaft 14 is rotatably journaled in suitable bearings (not shown) and carries an impeller 16 which is formed with suitable blades 18, the impeller hub 20 being provided with a threaded socket 22 designed for threaded reception over the reduced threaded end 24 of the shaft 14. The seal assembly, by means of which the opening 12 is sealed against passage of liquid therethrough, includes a washer assembly 26 which is nonrotatable and a rotatable seat assembly 28, the latter embodying the principles of the present invention. The washer assembly 26 is of more or less conventional design, a substantially identical assembly being shown in the patent to Carl E. Schmitz, No. 2,474,123, dated June 21, 1949, for Retainers for Fluid Seals. Briefly, the washer assembly 26 comprises a retainer or shell 30, preferably made of a noncorrodible material such as brass, stainless steel or the like, is positioned within the opening 12 with a fluid-tight fit, the retainer being provided for this purpose with an outer cylindrical wall 32 which snugly fits the bore of the recess 12 and a radial wall 34 which abuts a face 36 of the casing 10 surrounding the opening 12 and positions the retainer within the opening. The retainer 30 is also provided with an inner cylindrical wall 38 which is connected to the outer cylindrical wall 32 by a radial wall 40 having a shoulder or step 42 formed therein.

Disposed within the cylindrical retainer 30 is a tubular sealing element 44 comprised of a suitable elastomeric material such as rubber, either synthetic or natural, or a combination thereof. The sealing element 44 is formed with opposite end flanges 46 and 48 which are connected together by a cylindrical portion 50 having an inwardly directed fold 52 located centrally of the sealing element between the flanges 46 and 48. The shoulder 42 is so designed that the cylindrical portion 50 on one side of the fold 52 may be slipped over the shoulder to assist in centering the sealing element within the retainer.

Abutting against the flange 46 of the sealing element 44 is a sealing washer 54 having a shoulder 56 formed on the rear side thereof which underlies the cylindrical portion 50 of the sealing member 44 and which also fits within the cylindrical portion 38 of the retainer 30. A plurality of inwardly pressed ribs or indentations 58 extend into longitudinal grooves 60 formed internally of the washer 54 and provide a sliding connection between the washer and retainer whereby the former is held against rotational movement when the seal is in use. The washer 54 is normally urged forwardly against the seat member 28 by a spring 62 which is pressed between the two flanges 46 and 48. The washer assembly 26 thus far described is conventional in its design and no claim is made herein to any novelty associated therewith, the novelty of the present invention residing rather in the novel construction, combination and arrangement of parts of the seat assembly 28 which is about to be described.

The seat assembly 28 includes a generally cup-shaped retainer shell 70 which may be formed of brass having a radial end wall 72 and a cylindrical wall 74. Disposed within the retainer 70 and at least partially encompassed thereby is a ring-shaped seat proper 76 and a rubber or other suitable elastomeric ring 78 which is generally rectangular in cross section is interposed between the seat proper 76 and the retainer shell 70 and is seated within a rectilinear recess 80 provided in the washer. The seat proper 76 is provided with a radial surface 82 which has a running fit with a similar radial surface 84 formed on the washer 54. These two surfaces are ground and lapped to approximately a true plane surface with a degree of accuracy which is required for mechanical seals of this character. The radial wall 72 of the retainer shell 70 projects inwardly a slight distance beyond the inner cylindrical confines of the seat proper and the inner edge of this wall is firmly clamped against a resilient sealing gasket 86 which bears against a radial shoulder 88 provided on the shaft 14, the impeller hub 16 serving to effect this clamping action.

Reference to Fig. 2 will show that a slight clearance shown at 90 exists between the inner cylindrical surface of the seat proper 76 and the outer surface of the shaft 14 so that the seat proper is in effect a "floating" seat. The ring 78 is tightly compressed between the inner cylindrical confines of the wall 74 of the retainer 70 and the outer cylindrical surface of the recess 80 so that the ceramic seat element 76 is placed under relatively high inwardly directed compressional forces which are equally distributed around the surface of the seat.

By the arrangement of parts described above it will be seen that upon rotation of the impeller shaft 14 and impeller hub 16 a positive drive for the seat assembly 70 will be obtained by virtue of the fact that the inner edge of the retainer wall 72 is clamped between the impeller hub and shoulder 88. The high compressional forces that are exerted upon the body of the ceramic seat member 76 are such as to lend good coherence to the material of the seat so that it will not tend to crack when subjected to even severe shocks. Furthermore, a large area of the seat is shielded or protected against the splashing of liquid on the seat and this is particularly advantageous if the seal has run dry and becomes hot so that the application of the relatively cool liquid thereto would tend to shatter the same.

In compliance with 35 U. S. C. 112, a preferred form of the invention has been shown in the drawings and described herein, but it should be understood that the invention is not limited to the specific disclosure made, and that the appended claims should be construed as broadly as the prior art will permit.

What I claim and desire to secure by Letters Patent is:

1. The combination with a rotary impeller shaft having a forwardly facing shoulder provided thereon, of a seal seat assembly for a rotary mechanical seal telescopically received over said shaft, said assembly comprising in combination a seat proper in the form of a ceramic ring having a substantially flat rotary seat surface, a metal retainer of cup-shaped configuration having a cylindrical outer wall encircling the seat proper and a radial wall, and a resilient ring formed of elastomeric material interposed between said seat proper and the cylindrical wall of the retainer and serving to support the seat proper within the ring in floating spaced relationship with respect thereto and out of contact therewith, said radial wall of the retainer projecting inwardly beyond the inner cylindrical confines of the seat proper, and means for clamping the inner edge of said radial wall against said shoulder, said clamping means comprising the sole means for maintaining said seat assembly in position on said shaft.

2. The combination set forth in claim 1 including a resilient annular gasket interposed between said radial wall of the retainer and the shoulder on said shaft.

3. The combination with a rotary shaft having a radial shoulder thereon, of a rotary seat construction for a mechanical seal, said seat construction comprising a cup-shaped retainer ring having a cylindrical outer wall and a radial wall, said radial wall being formed with a central opening therethrough through which the shaft extends, means for clamping the inner edge of said radial wall against said shoulder to establish a positive drive for the retainer ring from the shaft, said clamping means comprising the sole support for said seat construction on said shaft, a resilient elastomeric supporting ring disposed within said retainer, said ring being generally rectangular in cross section and having an outer cylindrical surface fitting within the inner cylindrical surface of the cylindrical wall of the retainer and having a radial surface fitting against the radial wall of the retainer and a ceramic seat proper in the form of a ring having a reduced cylindrical portion tightly fitting within said elastomeric ring and having a rearwardly facing surface bearing against one radial wall of the elastomeric ring, the overall diameter of said seat proper being less than the diameter of the cylindrical wall of the retainer whereby said seat is supported within the retainer in floating spaced relationship with respect thereto, the inner diameter of said seat proper being greater than the diameter of the opening in said radial wall of the retainer and also being greater than the diameter of said shaft whereby said seat proper is maintained spaced from said shaft in floating relationship with respect thereto.

References Cited in the file of this patent

UNITED STATES PATENTS

| | | |
|---|---|---|
| 2,080,403 | Homan | May 18, 1937 |
| 2,200,413 | Christman et al. | May 14, 1940 |
| 2,264,739 | Boden | Dec. 2, 1941 |
| 2,418,185 | McConaghy | Apr. 1, 1947 |
| 2,425,209 | Snyder et al. | Aug. 5, 1947 |
| 2,433,589 | Adams | Dec. 30, 1947 |
| 2,628,852 | Voytech | Feb. 17, 1953 |
| 2,650,841 | Meyer | Sept. 1, 1953 |